Figure 1:
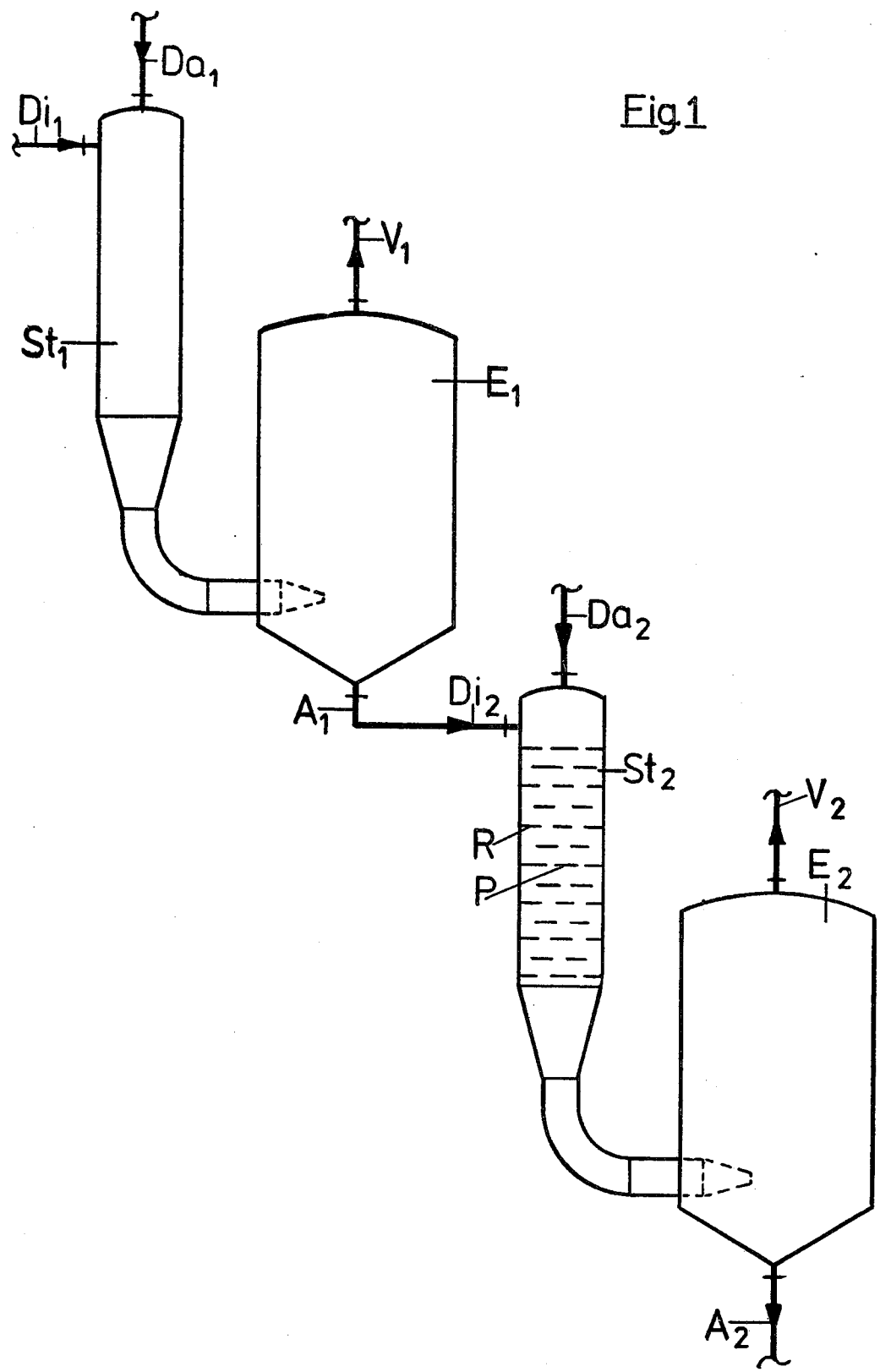

United States Patent [19]

Kalka et al.

[11] 4,138,310
[45] Feb. 6, 1979

[54] CONTINUOUS PROCESS FOR THE REMOVAL OF RESIDUAL MONOMER FROM AQUEOUS DISPERSIONS OF HOMO- AND COPOLYMERS OF VINYL CHLORIDE

[75] Inventors: Josef Kalka, Herten; Jürgen Beckmann, Oer-Erkenschwick, both of Fed. Rep. of Germany

[73] Assignee: Chemische Werke Huels Aktiengesellschaft, Marl, Fed. Rep. of Germany

[21] Appl. No.: 686,328

[22] Filed: May 14, 1976

[30] Foreign Application Priority Data

May 14, 1975 [DE] Fed. Rep. of Germany ....... 2521401

[51] Int. Cl.² .............................................. B01D 1/14
[52] U.S. Cl. ................................. 159/47 R; 159/165; 159/4 ST
[58] Field of Search ........... 159/DIG. 10, 16 S, 4 ST, 159/3; 203/88, 95–97; 526/344; 528/500, 502

[56] References Cited

U.S. PATENT DOCUMENTS

| 2,437,649 | 3/1948 | Milner | 203/96 |
| 2,510,548 | 6/1950 | Brunjes | 159/16 S |
| 3,469,617 | 9/1969 | Palmason | 159/16 S |
| 3,815,655 | 6/1974 | Burke, Jr. | 159/16 S |
| 3,926,927 | 12/1975 | Stookey | 159/16 S |
| 3,956,249 | 5/1976 | Goodman et al. | 526/344 |
| 3,975,230 | 8/1976 | Yang et al. | 526/344 |

FOREIGN PATENT DOCUMENTS

| 2532264 | 2/1976 | Fed. Rep. of Germany | 159/DIG. 10 |
| 2440957 | 3/1976 | Fed. Rep. of Germany | 159/DIG. 10 |
| 1154104 | 4/1969 | United Kingdom | 528/500 |

Primary Examiner—Hiram H. Bernstein
Attorney, Agent, or Firm—Millen & White

[57] ABSTRACT

Aqueous dispersions of homo- and co-polymers of vinyl chloride are freed of residual monomer in a continuous manner by mixing the dispersion with steam in a first flow pipe maintained at reduced pressure; degasifying the mixture to a first degasification vessel maintained at a lower pressure; again mixing the degassed mixture with steam in a second flow pipe, also maintained at reduced pressure and having fluid flow diverting means therein; and then again degasifying the mixture in a second degasification vessel maintained at a lower pressure than the second flow pipe.

6 Claims, 1 Drawing Figure

CONTINUOUS PROCESS FOR THE REMOVAL OF RESIDUAL MONOMER FROM AQUEOUS DISPERSIONS OF HOMO- AND COPOLYMERS OF VINYL CHLORIDE

BACKGROUND OF THE INVENTION

This invention relates to an improved process for the removal of residual monomer from aqueous dispersions of homo- and co-polymers of vinyl chloride.

The manufacture of homo- and copolymers of vinyl chloride by aqueous emulsion polymerization is well known. See, for example, monograph by Kainer, "Polyvinylchlorid and Vinylchlorid-Mischpolymerisate", Springer publishers, Berlin/Heidelberg/New York, 1965, pp. 34 et seq.

In the emulsion homo- and copolymerization of vinyl chloride, the polymerization generally is not continued to a quantitative conversion of the monomers. In fact, in many cases, the polymerization is terminated intentionally at a low degree of conversion. In all instances, considerable amounts of residual monomers remain in the thus-produced aqueous polymer dispersions.

The removal of a large portion of the residual monomers occurs upon expansion and/or evacuation, usually in the polymerization reactor. Vinyl chloride removed under vacuum is reintroduced into the gasometer. In spite of these vinyl recovery steps, the aqueous dispersion still contains about 1-2% by weight of monomer, based on the polymer. During the spray drying of these dispersions obtained from the emulsion polymerization more than 95% by weight of this residual monomer escapes into the atmosphere mixed with the dryer exhaust air. Spray-dried polyvinyl chlorides thus have residual monomer contents in the order of only 10-300 p.p.m.

However, as a result of ever-increasing efforts to reduce environmental pollution, the problem has arisen of decreasing the heretofore considerable vinyl chloride contents of the dryer exhaust air. To achieve this, it is necessary to substantially free the polyvinyl chloride dispersions of monomers prior to the drying procedure.

It is known that readily volatile monomers can be removed from synthetic resin dispersions by storing the dispersion in large expansion tanks. See German Pat. No. 1,248,943, column 2, lines 4-6. However, to employ this mode of operation requires an enormous capital investment in apparatus.

It is also known to conduct dispersions of polymers, including polyvinyl chloride, countercurrently to rising inert gases in spray adsorbers, thereby freeing the dispersions from readily volatile compounds. See German Unexamined Laid-Open application DOS 2,162,860. This mode of operation also requires a huge capital investment in apparatus.

The steam distillation of polymer dispersions for the purpose of removing readily volatile components is also known. See German Pat. No. 1,248,943, column 2, lines 24-28. However, this mode of operation cannot be readily employed with polymer dispersions obtained by emulsion polymerization because such dispersions, due to their emulsifier content, have such a low surface tension that excessive foaming occurs during a steam distillation.

In a known (German Pat. No. 1,248,943) batch process, the foam produced during the steam distillation of dispersions having a surface tension of below 40 dynes per centimeter is broken up by subjecting the thus-formed steam-dispersion foam mixture to a rapid pressure drop at flow velocities of more than 100 m./sec. The thus-defoamed dispersion is then reintroduced into the steam distillation from the separator, i.e., it is recycled. As disclosed in German Pat. No. 1,248,943, column 5, lines 19-22, such a process can be conducted continuously only employing several units connected in series in a cascade arrangement. Such an arrangement obviously requires a huge investment in capital equipment. Also, such a series arrangement of several units represents a large mechanical load on the dispersions, which have a high solids content and are low in emulsifier, as they are exclusively manufactured in modern large-scale technical processes. As a result, in a most undesirable way, depositions of sediment and coagulate are formed from the poorly stable dispersions in the pipelines between the degasification vessels.

As disclosed in Fed. Rep. of Germany Patent application P 24 40 957.2, corresponding to U.S. Pat. No. 4,007,022 such difficulties are overcome in a continuous process for the removal of monomeric impurities from aqueous dispersions of homo- and copolymers of vinyl chloride having a surface tension of below 60 dyn/cm. by treatment of the dispersions with steam and avoiding foam formation by rapidly lowering the pressure at high flow velocities. In that process, a stream of the dispersion is mixed continuously with steam in an elongate mixing zone, via, a flow pipe, at a rate such that the flow velocity of the mixture therein is 1-20 m./sec., and at a pressure in the flow pipe of 150-600 torr. A stream of the mixture of steam and dispersion is withdrawn from the flow pipe at a speed of 30-100 m./sec., and fed to an evacuated degasification zone, i.e., a degasification vessel, maintained at a pressure which is 30-200 torr lower than the pressure in the flow pipe. A stream of the degasified mixture is withdrawn continuously from the degasification vessel.

It has now been found that surprisingly very much lower residual monomer concentrations can be attained by the process of this invention than are attainable by the continuous steam treatment described in U.S. Pat. No. 4,020,032.

SUMMARY OF THE INVENTION

According to this invention, residual monomer is removed from aqueous dispersions of homo- and copolymers of vinyl chloride having a surface tension of below 60 dyn/cm. by a steam treatment in which foaming is avoided by rapid lowering of pressure at high flow velocity and which comprises the steps of (a) mixing a stream of the monomer-containing dispersion with steam in an elongate mixing zone maintained at a pressure of 150-600 torr, at a rate such that the flow velocity of the mixture in the mixing zone is 1-20 m./sec.

(b) withdrawing a stream of the mixture from the mixing zone at a velocity of 30-100 m./sec. from the mixing zone, (c) feeding the stream of the mixture withdrawn from the mixing zone to a degasification zone maintained at a pressure 30-200 torr lower than the pressure in the mixing zone, (d) withdrawing a stream of the degasified dispersion from the degasification zone.

Employing the process and apparatus of this invention, improved residual monomer contents are achieved by repeating the above steps, employing as starting material the degasified dispersion withdrawn from the degasification zone, in a second degasification zone maintained at a pressure of 150–600 torr and fitted internally with fluid flow diverting means, and in a second degasification zone maintained at a pressure 30–200 torr lower than the pressure in the second mixing zone.

DRAWING

Apparatus suitable for conducting the process of this invention is shown in the drawing. As shown therein, such apparatus comprises a first flow pipe $St_1$ which is mounted in gas tight connection to and with its exit end internal of a first degasification vessel $E_1$. Flow pipe $St_1$ is fitted near its upper end with a polymer dispersion inlet pipe $Di_1$ and a steam inlet pipe $Da_1$. The lower end of the flow pipe narrows to a nozzle, preferably a "Feld nozzle" as described in German Patent 731,756, fitted internally in first degasification vessel $E_1$. Degasification vessel $E_1$ has a bottom drain pipe $A_1$ and an upper evacuation pipe $V_1$ connected to a vacuum source (not shown).

Drain pipe $A_1$ is fitted in gas tight connection by dispersion inlet pipe $Di_2$ to the upper end of a second flow pipe $St_2$ containing fluid flow diverting internal installations in the form of plates P and rings R. Steam is fed thereto from a second steam inlet pipe $Da_2$. Like first flow pipe $St_1$, second flow pipe $St_2$ is mounted in gas tight connection to and with its exit end internal of a second degasification vessel $E_2$ fitted with a bottom drain $A_2$ and an upper gas evacuation pipe $V_2$ connected to a vacuum source (not shown).

The ratio of the diameter of each flow pipe to the length thereof preferably is from 0.03:1 to 0.3:1. The volume of first flow pipe $St_1$ should be from 5 to 50 liters and the volume of the second flow pipe $St_2$ should be from 5 to 200 liters per ton of dispersion passed therethrough per hour. For a throughput of up to about 10 tons of dispersion per hour, the length of first flow pipe $St_1$ should be at least 70 cm. and at most 2 m., and that of second flow pipe $St_2$ at least 1.50 m. and at most 8 m.

DETAILED DISCUSSION

In a preferred embodiment of this process, the amount of mixture of steam and dispersion passed therethrough is 100–10,000 kg./h. and per $m^2$ of surface area of internal fluid flow diverting means (baffles) in second flow pipe $St_2$.

In a further preferred embodiment, the pressure loss in the second flow pipe is 10–380 torr.

Suitably, the steam-dispersion ratio in the first and second flow pipes is 1:10 to 1:50, and the steam is saturated.

In carrying out the process of this invention, polymer dispersions and steam are continuously fed to first flow pipe $St_1$ which is maintained at an ambient pressure of 150–600 torr, corresponding to a temperature of 60–94° C., by the vacuum source joined to the first flow pipe by evacuation pipe $V_1$. An intimate intermixing of steam and dispersion takes place in the first flow pipe and special installations for mixing purposes are generally unnecessary. If such installations are provided, then these can consist of plates or rings; however, care must be taken that the pressure drop in the flow pipe is less than 450 torr. The flow velocity in the flow pipe is 1–20m./sec., preferably 2–10 m./sec. The average (mean) residence time of the dispersion and steam mixture in the flow pipe is 0.02 – 10 seconds.

The lower end of first flow pipe is disposed in fluid tight connection in the first degasification vessel $E_1$ and a pressure gradient of 30 to 200 torr is maintained between that end of the flow pipe and the degasification vessel. The end of the flow pipe tapers to a nozzle and constricts the flow of the steam and dispersion mixture to such an extent that the steam-dispersion mixture exists from the flow pipe at a velocity of 30–100 m./sec., with the result that foam formation in the degasification vessel is precluded.

It is particularly expedient for the nozzle end of the flow pipe to be pointed in a direction such that the dispersion-steam mixture enters the degasification vessel from the flow pipe in a direction tangential to the wall of the degasification vessel.

The residence time in the degasification vessel is not critcal and can be as short as 10 second and as long as 5 minutes. If necessary, this residence time can be regulated by level control means (not shown) for the degasification vessel.

In first degasification vessel $St_1$, the monomer and the steam are separated from the dispersion. The monomer and the steam are discharged via evacuation pipe $V_1$ whereas the dispersion is discharged from drain pipe $A_1$ via dispersion inlet pipe $Di_2$ to the second flow pipe $St_2$ provided with baffles and is mixed therein with steam under a pressure of 150–600 torr from inlet pipe $Da_2$. The steam is introduced axially and downwardly at the head of flow pipe $St_2$, i.e., vertically to the direction of the dispersion entering the flow pipe.

The dispersion can be transferred from the first degasification vessel $E_1$ to the second flow pipe $St_2$ by a pressure differential maintained therebetween or it can be pumped from the first degasification vessel to the second flow pipe.

In the second flow pipe $St_2$, the fluid-flow-diverting elements can take the shape of plates and rings. However, the exact configuration is not critical, so long as the mixture of steam and dispersion takes a convoluted downward path through the second flow pipe.

Like the first flow pipe, the lower end of second flow pipe $St_2$ has a tapered portion, preferably in the form of a nozzle, through which the steam-dispersion mixture flows from the second flow pipe to the second degasification vessel. The tapered portion constricts the flow of the mixture of steam and dispersion out of the second flow pipe, thereby creating a pressure gradient of 30–200 torr between the end of the second flow pipe and the second degasification vessel. High flow velocities to prevent foam formation are unnecessary in the second flow pipe.

A separation of dispersion and monomer occurs not only in the first and second degasification vessels but also in the second flow pipe as well. A mixture of monomer and steam are withdrawn together from the upper end of the second degasification vessel through evacuation pipe $V_2$ and the dispersion collects in the lower portion of the second degasification vessel and exits via drain pipe $A_2$. The load on second flow pipe $St_2$ is 100 – 10,000 kg. of dispersion and steam per hour per square meter of plate and ring (baffle) surface area.

The plates and rings are so arranged and/or their number selected such that the pressure drop between the head and the bottom of second flow pipe $St_2$ is 10–300 torr. The steam and the dispersion are advantageously mixed in the first and second flow pipes in a weight ratio of 1:10 to 1:50. To ensure a gentle treatment of the dispersion, saturated steam is utilized.

The process of this invention is especially useful for dispersions obtained by continuous polymerization, since the polymerization and degasification steps can be connected directly in series to the reactor and thus a complete continuity of manufacture and degasification, i.e., residual monomer removal, is possible. However, the process of this invention is also very suitable for dispersions produced by discontinuous polymerization and thus lower emulsifier contents, since it treats such low-stability, low-emulsifier dispersions in a very gentle manner, thereby permitting monomer removal without adverse effects upon the dispersion.

The process of this invention can be employed especially advantageously with dispersions having high solids content and low emulsifier content. A procedure which can be employed for the production of high-solids, low-emulsifier dispersions is described in German Published Application DAS 1,964,029, according to which the emulsifier is continuously added in a specific manner during the polymerization process.

By the process of this invention, it is possible to degasify dispersions almost quantitatively with a low capital investment in apparatus. The mechanical stress on the dispersion is extremely low, because the dispersion is conducted through the degasifying apparatus along a very short path. Consequently, the stability of the dispersion is thus not impaired and deposits of coagulate and sediment in the equipment are minor. The process can be conducted almost entirely free of the necessity of servicing. Above all, the process is especially economical because the steam quantities required are very low.

It is not possible to get the same practically perfect removal of monomeric impurities from the dispersion by adding installations, i. e. fluid flow diverting means, in flow pipe $St_1$. Those installations in flow pipe $St_1$ would lead to a high pressure drop and mechanical stresses of the polymer dispersion. Accordingly, deposits of coagulate and sediment would be formed in a highly undesirable manner.

Defrothers are not required in the process of this invention. However, if defrothers are used, it is possible to discharge the steam-dispersion mixture from the first flow pipe at a lower exit velocity.

The process of this invention can be utilized with all dispersions of homo- and copolymers of vinyl chloride having surface tensions of below 60 dyn/cm., irrespective of the type of emulsifier therein and monomer concentration thereof. The copolymers can be formed from up to 50% by weight of comonomer.

Especially suitable as comonomers are monoolefinic unsaturated compounds, e.g., vinylidene chloride or vinyl esters of straight-chain or branched carboxylic acids of 2–20, preferably 2–4 carbon atoms, e.g., vinyl acetate, vinyl propionate and vinyl butyrate; as well as unsaturated acids, e.g., maleic, fumaric, itaconic, crotonic, acrylic and methacrylic acid, as well as the mono- or diesters thereof with mono- or di-alcohols, e.g., of 1–10 carbon atoms; α-olefins, e.g., ethylene, propylene, isobutylene, styrene and acrylonitrile; and polyunsaturated compounds, e.g., butadiene.

Suitable catalysts for the production of the homo- and copolymers are the water-soluble compounds conventionally employed in emulsion polymerizations, e.g., hydrogen peroxide, sodium persulfate, potassium persulfate and redox systems, e.g., $H_2O_2$/ascorbic acid, in the usual concentration. Suitable emulsifiers are the conventional types. Especially suitable are ionic emulsifiers, e.g., salts of carboxylic acids, e.g., sodium caprinate, sodium laurate, sodium myristate and sodium palmitate. Also suitable are salts of primary and secondary alkyl sufates, e.g., sodium capryl sulfate, sodium lauryl sulfate, sodium myristyl sulfate, and sodium oleyl sulfate. Also suitable are sulfates of esterified polyoxy compounds, e.g., monofatty acid glycerol sulfuric acid ester, salts of primary and secondary alkyl sulfonates, such as sodium ethyl sulfonate, sodium stearyl sulfonate, sodium oleyl sulfonate and n-alkane-sulfonates with a statistical distribution of the sulfonic acid group and a chain length of $C_{13}$–$C_{17}$, and others. It is also possible to employ alkyl aryl sulfonates, e.g., the sodium salt of p-n-dodecylbenzenesulfonic acid.

Mixtures of emulsifiers are also suitable. Auxiliary agents can also be employed with the aforementioned emulsifiers, including alcohols, e.g., lauryl alcohol, esters, e.g., sorbitan monolaurate and carboxylic acid glycol esters.

The polymerization temperature can be 40–70° C., depending on the desired K-value. The polymerization can be conducted continuously or discontinuously.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 (COMPARATIVE EXAMPLE)

(According to U.S. Pat. No. 4,020,032)

Employing equipment corresponding to the first flow pipe and first degasification vessel shown in the drawing, a flow pipe $St_1$ having a length of 1500 mm. and an internal diameter of 280 mm., (internal volume: 0,092 m$^3$), the lower end of which tapers to 60 mm. (15° angle of inclination with respect to the longitudinal axis) and mounted tangentially to the wall of a degastification vessel $E_1$ having a diameter of 1600 mm. and a height of 3000 mm. is charged with 800 kg. per hour of steam at a temperature of 90° C., from a steam saturator (not shown) and 8 tons per hour of a polyvinyl chloride dispersion (manufactured according to Example 1 of DOS 2,208,442, having a solids concentration of 48%, an alkyl sulfonate concentration of 2.2% by weight, a surface tension of 34 dyn/cm., a temperature of 40° C., and containing 70,000 p.p.m. of vinyl chloride, based on the dispersion.

The pressure in the flow pipe is 450 torr, corresponding to 86° C. The mixture is discharged from the flow pipe at a velocity of 90 m/sec. into the upper portion of the degasification vessel.

Monomer and steam are withdrawn from the top of the degasification vessel, maintained at a pressure of 250 torr, and the dispersion is pumped out of the bottom thereof via the bottom drain $A_1$.

The dispersion exiting from the degasification vessel has a vinyl chloride concentration of 500 p.p.m. (based on the dispersion).

EXAMPLE 2

The procedure of Example 1 is followed, except the dispersion exiting from the degasification vessel is then continuously fed to a second flow pipe $St_2$ having a height of 6000 mm. and a diameter of 420 mm. (internal volume: 0,83 m$^3$). This flow pipe contains 15 rings spaced 350 mm. apart having an external diameter of 410 mm. and an internal diameter of 200 mm. Between every two such rings is positioned one plate having a diameter of 340 mm. The lower end of the pipe is narrowed like the first pipe to a nozzle. The diameter of the outlet opening is 60 mm. The pressure drop in the second flow pipe is 50 torr.

The dispersion exiting from the second flow pipe is introduced into a second degasification vessel $E_2$ of the same type as the first vessel, and removed therefrom continuously via its bottom drain $A_2$. The monomer and steam are removed from the degasification vessel $E_2$ by suction via drain $A_2$ and gas evacuation pipe $V_2$, respectively.

The dispersion is mixed in first flow pipe $St_1$ with 530 kg./h. of steam and in second flow pipe $St_2$ with 270 kg./h. of steam from a steam saturator at a temperature of 90° C. upstream of first flow pipe and at a temperature of 75° C. upstream of the second flow pipe. The pressure in the first flow pipe is 450 torr, which corresponds to 86° C.; in the first degasification vessel, 250 torr; in the second flow pipe, 250 torr, which corresponds to 72° C.; and in the second degasification vessel, 180 torr. The amount of the mixture of steam and dispersion passing through the second flow pipe is 2,200 kg. per hour per square meter of surface area of baffles in the second flow pipe.

The dispersion exiting from the second degasification vessel has a vinyl chloride concentration of 40 p.p.m. (based on the dispersion).

EXAMPLE 3

The procedure of Example 2 is employed except the dispersion fed to the first flow pipe contains 2% of vinyl chloride, based on the dispersion. The dispersion leaving the second degasification vessel has a vinyl chloride concentration of 8 p.p.m. (based on the dispersion).

EXAMPLE 4

The procedure of Example 2 is followed except that instead of a polyvinyl chloride dispersion, a dispersion of a copolymer of vinyl chloride produced according to Example 2 of DOS 2,208,442 is employed. The copolymer contains 85% by weight of vinyl chloride and 5% by weight of vinyl acetate. The surface tension of the dispersion is 35 dyn/cm., the solids content thereof is 46% by weight, and the monomer content thereof is 5% by weight. The dispersion exiting from the second degasification vessel has a vinyl chloride concentration of 32 p.p.m. (based on the dispersion).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of residual monomer from aqueous dispersions of homo- and copolymers of vinyl chloride having a surface tension of below 60 dyn/cm. by a steam treatment in which foaming is avoided by rapid lowering of pressure at high flow velocity and which comprises the steps of
    (a) mixing a stream of the monomer-containing dispersion with steam in an elongate mixing zone maintained at a pressure of 150–600 torr at a rate such that the flow velocity of the mixture in the mixing zone is 1–20 m./sec.,
    (b) withdrawing a stream of the mixture from the mixing zone at a velocity of 30–100 m./sec. from the mixing zone,
    (c) feeding the stream of the mixture withdrawn from the mixing zone to a degasification zone maintained at a pressure 30–200 torr lower than the pressure in the mixing zone, and
    (d) withdrawing a stream of the degasified dispersion from the degasification zone,
    (e) the improvement which comprises repeating the above steps, employing as starting material the degasified dispersion withdrawn from the degasification zone, in a second mixing zone maintained at a pressure of 150–600 torr and fitted internally with fluid flow diverting means, and in a second degasification zone maintained at a pressure 30–200 torr lower than the pressure in the second mixing zone.

2. A process according to claim 1, wherein the amount of the mixture of steam and dispersion passing through the second mixing zone is 100 – 10,000 kg. per hour per square meter of surface area.

3. A process according to claim 1 wherein the pressure drop in the second mixing zone is 10–300 torr.

4. A process according to claim 1 wherein the steam-dispersion ratio in each of the mixing zones is from 1:10 to 1:50.

5. A process according to claim 1 wherein the steam employed in both mixing zones is saturated.

6. A process according to claim 2 wherein the pressure drop in the second mixing zone is 10–300 torr, wherein the steam-dispersion ratio in each of the mixing zones is from 1:10 to 1:50, and wherein the steam employed in both mixing zones is saturated.

* * * * *